United States Patent
Yang et al.

(10) Patent No.: US 10,094,217 B2
(45) Date of Patent: Oct. 9, 2018

(54) CONSTRUCTION LAYOUT FOR CAVERNS OF UNDERGROUND NUCLEAR POWER PLANT

(71) Applicant: CHANGJIANG SURVEY PLANNING DESIGN AND RESEARCH CO., LTD., Wuhan (CN)

(72) Inventors: Qigui Yang, Wuhan (CN); Xinqiang Niu, Wuhan (CN); Lijun Su, Wuhan (CN); Baixing Liu, Wuhan (CN); Lixin Liu, Wuhan (CN); Xin Zhao, Wuhan (CN); Xuehong Yang, Wuhan (CN); Feng Li, Wuhan (CN); Xia Hua, Wuhan (CN); Xuexian Zhu, Wuhan (CN); Qianlong Han, Wuhan (CN); Xiao Pan, Wuhan (CN); Haibo Liu, Wuhan (CN)

(73) Assignee: CHANGJIANG SURVEY PLANNING DESIGN AND RESEARCH CO., LTD., Wuhan (CN)

( * ) Notice: Subject to any disclaimer, the term of this patent is extended or adjusted under 35 U.S.C. 154(b) by 130 days.

(21) Appl. No.: 15/376,634

(22) Filed: Dec. 12, 2016

(65) Prior Publication Data
US 2018/0003055 A1 Jan. 4, 2018

Related U.S. Application Data (63) Continuation-in-part of application No. PCT/CN2015/079885, filed on May 27, 2015.

(30) Foreign Application Priority Data

Jun. 13, 2014 (CN) .......................... 2014 1 0264204
Jun. 13, 2014 (CN) ..................... 2014 2 0316771 U (51) Int. Cl.
*E21D 13/00* (2006.01)
*E02D 29/045* (2006.01)
(Continued)

(52) U.S. Cl.
CPC ........... *E21D 13/00* (2013.01); *E02D 29/045* (2013.01); *E21D 9/14* (2013.01); *G21D 1/00* (2013.01); *G21C 1/00* (2013.01)

(58) Field of Classification Search
CPC ....... E02D 29/04; E02D 29/045; E21D 13/00; G21D 1/00; Y02E 30/40
See application file for complete search history.

(56) References Cited

U.S. PATENT DOCUMENTS 3,330,122 A * 7/1967 Janner .................... G21C 13/04
                                                        29/421.1
3,996,751 A * 12/1976 Hallenius ................ E21D 13/00
                                                        376/260

(Continued)

FOREIGN PATENT DOCUMENTS

| CN | 104051037 | * | 9/2014 |
| CN | 203839051 | * | 9/2014 |
| CN | 106531267 | * | 3/2017 |

*Primary Examiner* — Frederick Lyndon Lagman
(74) *Attorney, Agent, or Firm* — Matthias Scholl P.C.; Matthias Scholl (57) ABSTRACT

A construction layout for caverns of an underground nuclear power plant, including: two primary caverns accommodating nuclear reactor powerhouses, combined caverns, electric powerhouse caverns, pressure relief caverns, a first primary traffic tunnel, a second primary traffic tunnel, a third primary traffic tunnel, a top adit system, and a ground adit system. Each combined cavern is disposed on one side of each of the two primary caverns. Each electric powerhouse cavern and each pressure relief cavern are disposed on two sides of each of the two primary caverns perpendicular to the longitudinal direction of the mountain. Each electric powerhouse cavern (Continued)

is perpendicular to the longitudinal direction of the mountain. The first primary traffic tunnel and the third primary traffic tunnel are disposed along the longitudinal direction of the mountain on outer sides of the two combined caverns, respectively.

12 Claims, 3 Drawing Sheets

(51) Int. Cl.
*E21D 9/14* (2006.01)
*G21D 1/00* (2006.01)
*G21C 1/00* (2018.01)

(56) References Cited

U.S. PATENT DOCUMENTS

| | | | | |
|---|---|---|---|---|
| 4,167,087 A * | 9/1979 | Schabert | ............ | G21C 13/00 109/15 |
| 4,708,522 A * | 11/1987 | Bergman | ............ | G21F 9/34 376/272 |
| 4,971,752 A * | 11/1990 | Parker | ............ | G21C 9/02 376/272 |
| 5,746,540 A * | 5/1998 | Hindle | ............ | G21D 1/003 376/273 |
| 5,855,452 A * | 1/1999 | Sagefors | ............ | E21D 13/00 405/133 |
| 6,597,755 B2 * | 7/2003 | Seefeld | ............ | G21C 9/00 294/82.24 |
| 2010/0303192 A1 * | 12/2010 | Antignano | ............ | G21D 1/00 376/273 |
| 2014/0161217 A1 * | 6/2014 | Rump | ............ | G21D 1/00 376/273 |
| 2015/0131769 A1 * | 5/2015 | Larrion | ............ | A62B 1/02 376/282 |
| 2017/0092384 A1 * | 3/2017 | Niu | ............ | G21F 9/22 |

* cited by examiner

CONSTRUCTION LAYOUT FOR CAVERNS OF UNDERGROUND NUCLEAR POWER PLANT

CROSS-REFERENCE TO RELATED APPLICATIONS

This application is a continuation-in-part of International Patent Application No. PCT/CN2015/079885 with an international filing date of May 27, 2015, designating the United States, now pending, and further claims foreign priority benefits to Chinese Patent Application No. 201410264204.6 filed Jun. 13, 2014, and to Chinese Patent Application No. 201420316771.7 filed Jun. 13, 2014. The contents of all of the aforementioned applications, including any intervening amendments thereto, are incorporated herein by reference.

BACKGROUND OF THE INVENTION

Field of the Invention

The invention relates to a construction layout for caverns of an underground nuclear power plant.

Description of the Related Art

Conventional construction layouts for caverns of an underground nuclear power plant leave much to be desired. In general, the distribution of the caverns is irregular, which means that parts of the terrain are heavily excavated posing hidden risks. In addition, the random distribution of the primary caverns adversely affects the construction of adits. This delays the construction time and increases the investment cost.

SUMMARY OF THE INVENTION

In view of the above-described problems, it is one objective of the invention to provide an improved construction layout for caverns of an underground nuclear power plant that is highly modularized and allows for expedient construction of the power plant.

To achieve the above objective, in accordance with one embodiment of the invention, there is provided a construction layout for caverns of an underground nuclear power plant. The construction layout comprises: two primary caverns accommodating nuclear reactor powerhouses, combined caverns, electric powerhouse caverns, pressure relief caverns, a first primary traffic tunnel, a second primary traffic tunnel, and a third primary traffic tunnel. A connecting line of medial axes of two primary caverns accommodating nuclear reactor powerhouses is perpendicular to a longitudinal direction of a mountain. A combined cavern is disposed on one side of each of the two primary caverns accommodating nuclear reactor powerhouses along the longitudinal direction of the mountain. An electric powerhouse cavern and a pressure relief cavern are disposed on two sides of each of the two primary caverns perpendicular to the longitudinal direction of the mountain. Each electric powerhouse cavern is perpendicular to the longitudinal direction of the mountain. The first primary traffic tunnel and the third primary traffic tunnel are disposed along the longitudinal direction of the mountain on outer sides of two combined caverns, respectively. The second primary traffic tunnel is disposed along the longitudinal direction of the mountain between the two combined caverns. One end of each of the first primary traffic tunnel, the second primary traffic tunnel, and the third primary traffic tunnel communicates with a ground surface. The two primary caverns, the combined caverns, the electric powerhouse caverns, and the pressure relief caverns form a cavern group of the nuclear island powerhouse of the underground nuclear power plant. A skewback or an endwall of an arch crown of each cavern of the cavern group communicates with the ground surface via a top adit system functioned in construction. A bottom of a sidewall or a bottom of an endwall of each cavern of the cavern group communicates with the first primary traffic tunnel, the second primary traffic tunnel, and the third primary traffic tunnel via a ground adit system functioned as a slag discharging channel.

In a class of this embodiment, the top adit system comprises: a first primary adit, a first top adit of a first primary cavern, a second top adit of a second primary cavern, a second primary adit, a third primary adit, third top adits of end parts of the combined caverns, fourth top adits of the electric powerhouse caverns. Fifth top adits of middle sections of the combined caverns, a sixth top adit of a first pressure relief cavern, and a seventh top adit of a second pressure relief cavern. The first primary adit, the second primary adit, and the third primary adit are arranged along the longitudinal direction of the mountain and communicate with the ground surface. An elevation of the first primary adit is higher than an elevation of the second primary adit and an elevation of the third primary adit. The first primary adit communicates with skewbacks of arch crowns of the two primary caverns via the first top adit and the second top adit, respectively. One end of the second primary adit and one end of the third primary adit communicate with the endwall of the arch crown of one end of a first combined cavern and the endwall of the arch crown of one end of a second combined cavern, respectively. A middle section of the second primary adit communicates with the endwall of the arch crown of the other end of the first combined cavern via one of the third top adits. A middle section of the third primary adit communicates with the endwall of the arch crown of the other end of the second combined cavern via the other of the third top adits. Middle sections of the third top adits communicate with endwalls of arch crowns of one ends of the electric powerhouse cavern via the fourth top adits of the electric powerhouse caverns, respectively. The middle section of the second primary adit communicates with the skewback of the arch crown of a middle section of the first combined cavern via one of the fifth top adits. The middle section of the third primary adit communicates with the skewback of the arch crown of a middle section of the second combined cavern via the other of the fifth top adits. The sixth top adit and the seventh top adit are disposed on the middle section and the end of the third primary adit to communicate with the skewback of the arch crown of the first pressure relief cavern and the skewback of the arch crown of the second pressure relief cavern, respectively.

In a class of this embodiment, each top adit of the top adit system has a longitudinal slope smaller than 12%.

In a class of this embodiment, the ground adit system comprises: first bottom adits of the two primary caverns, second bottom adits of first end parts of the combined caverns, third bottom adits of the electric powerhouse caverns, fourth bottom adits of second end parts of the combined caverns, and fifth bottom adits of the pressure relief caverns. The second primary traffic tunnel communicates with the bottom of the sidewall of the first primary cavern and a bottom of the first pressure relief cavern via one of the first bottom adits and one of the fifth bottom adits, respectively. the third primary traffic tunnel communicates with the bottom of the sidewall of the second primary cavern and a bottom of the second pressure relief cavern via the other of the first bottom adits and the other of the fifth bottom adit, respectively. The first primary traffic tunnel communicates with the bottom of the endwall of one end of the first combined cavern via one of the second bottom adit. the second primary traffic tunnel communicates with the bottom of the endwall of one end of the second combined cavern via the other of the second bottom adits. Each of the second bottom adits of the first end parts of the combined caverns communicates with the bottom of the endwall of corresponding electric powerhouse cavern via each third bottom adit connected. The other end of the second primary traffic tunnel communicates with the bottom of the endwall of the other end of the first combined cavern via one of the fourth bottom adits. the other end of the third primary traffic tunnel communicates with the bottom of the endwall of the other end of the second combined cavern via the other of the fourth bottom adits.

In a class of this embodiment, each bottom adit of the ground adit system has a longitudinal slope smaller than 12%.

In a class of this embodiment, each of the combined caverns comprises: a first safe powerhouse cavern, a nuclear fuel powerhouse cavern, a second safe powerhouse cavern, and a nuclear auxiliary powerhouse cavern longitudinally connected in series. Each of the second bottom adits of the first end parts of the combined caverns communicates with a bottom of an endwall of the first safe powerhouse cavern. Each of the fourth bottom adits communicates with a bottom of a sidewall of the nuclear auxiliary powerhouse cavern. One ends of the second primary adit and the third primary adit communicate with endwalls of arch crowns of outer end faces of corresponding nuclear auxiliary powerhouse cavern. Each of the third top adits of the end parts of the combined caverns communicates with an endwall of an arch crown of an outer end face of the first safe powerhouse cavern. Each of the fifth top adits of the middle sections of the combined caverns communicates with a skewback of an arch crown of the second safe powerhouse cavern.

In a class of this embodiment, each of the two primary caverns communicates with a corresponding electric powerhouse cavern via a primary steam channel communicating with the ground surface. And the two primary caverns are provided with corresponding apparatus conveying channels communicating with the ground surface.

Advantages of the construction layout for caverns of the underground nuclear power plant according to embodiments of the invention are summarized as follows:

The primary traffic tunnels having the elevation of ±0 m are fully utilized to construct bottom adits of the powerhouse caverns as the slag discharging channels and to construct top adits of the powerhouse caverns as the construction channels communicating with the ground surface, so that the construction of the powerhouse caverns can be organized using the fewest construction channels according to the ore pass method (the ore pass method refers to arrange a slag discharging pit in a vertical direction between an upper channel and a lower channel in an excavation region, use the upper channel as the construction channel, and introduce slags produced in the construction to the lower channel via the slag discharging pit so as to carry the slag out of the construction site). Each powerhouse cavern is only provided with the bottom adits and the top adits. The top adit system communicates with the arch crowns of the powerhouses and the ground adit system communicates with the bottom of the walls of the powerhouses. Since the elevation difference between the bottom elevation of the pressure relief cavern and the elevation of the primary traffic tunnels reaches 20 m, it is difficult to arrange the bottom adits having proper slops, therefore, the bottom adits of the pressure relief caverns are firstly connected horizontally to the axes of the pressure relief caverns and then connected to the bottoms of the pressure relief caverns by arranging the slag discharging pits.

The bottom adits arranged at the bottom layer of the combined caverns which are formed by the nuclear auxiliary powerhouse caverns, the second safe powerhouse caverns, the nuclear fuel powerhouse caverns, and the first safe powerhouse caverns, the two primary caverns, the electric powerhouse caverns, and the pressure relief caverns all communicate with the primary traffic tunnel. The top adits arranged at the top layer of the combined caverns which are formed by the nuclear auxiliary powerhouse caverns, the second safe powerhouse caverns, the nuclear fuel powerhouse caverns, and the first safe powerhouse caverns, the two primary caverns, the electric powerhouse caverns, and the pressure relief caverns all communicate with the second traffic tunnel, the third traffic tunnel, and the fourth traffic tunnel.

As possessing the highest arch crowns, the two primary caverns are unable to share common construction channels with other caverns either on the vertical face or the horizontal face, thus, a separate first primary adit is arranged. The first primary adit is bifurcated to form two top adits of the two primary caverns respectively connected to the skewbacks of the two primary caverns.

The construction layout of the invention has fewest construction channels arranged according to the ore pass method. The construction layout of the invention is short, safe, economic, highly modularized, and convenient in construction, which satisfies the general requirement of the construction.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a construction layout for caverns of an underground nuclear power plant are described below. It should be noted that the following examples are intended to describe and not to limit the invention.

Figure 1:
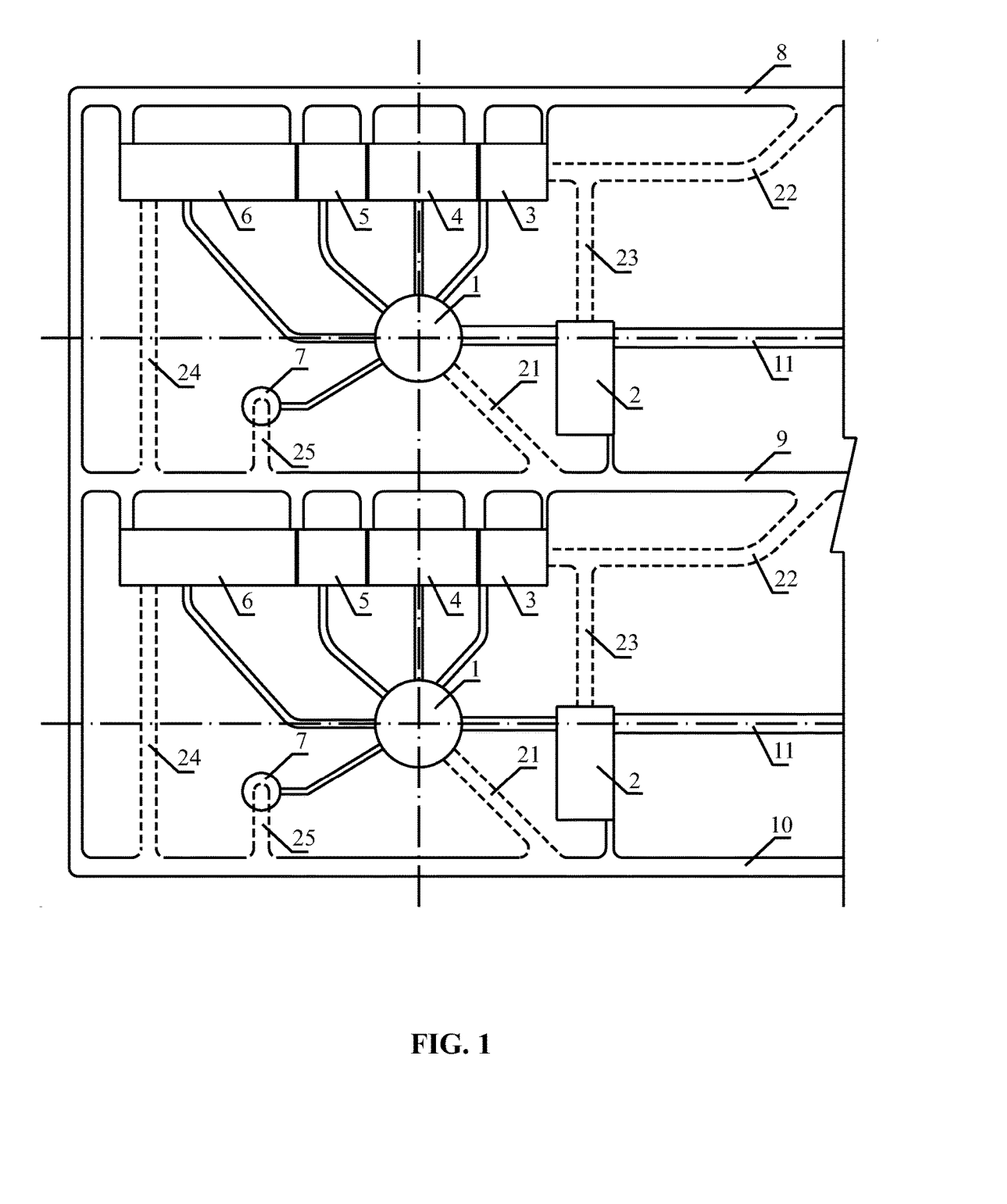
FIG. 1 is a structure diagram of a ground adit system of a construction layout of caverns of an underground nuclear power plant in accordance to one embodiment of the invention.
Figure 2:
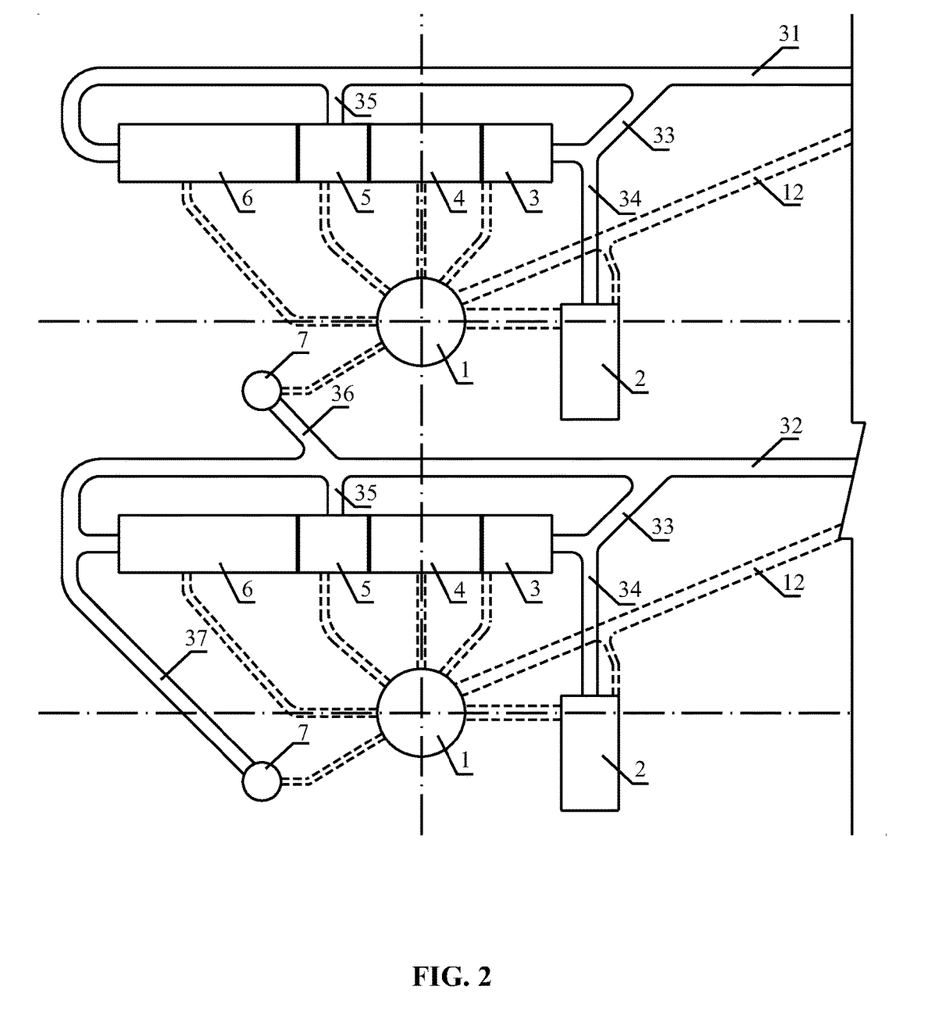
FIG. 2 is a structure diagram of a top adit system, combined caverns, electric powerhouse caverns, and pressure relief caverns of a construction layout of caverns of an underground nuclear power plant in accordance to one embodiment of the invention.
Figure 3:
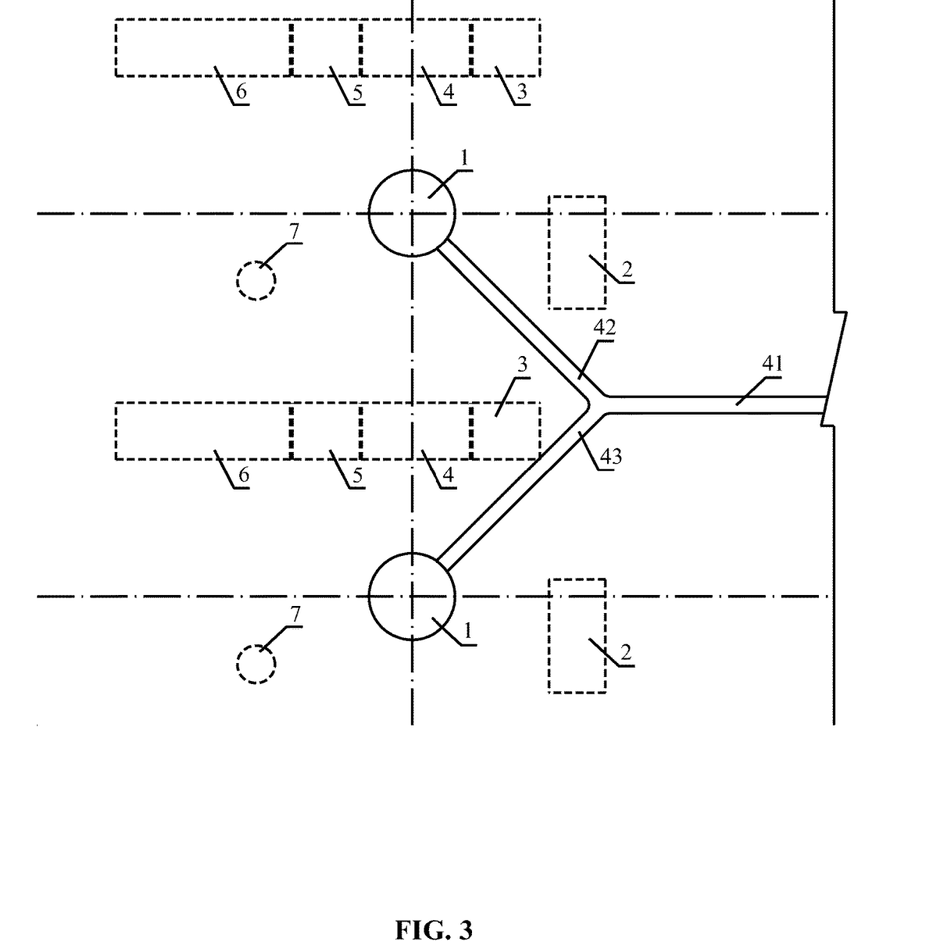
FIG. 3 is a structure diagram of primary caverns and a top adit system of a construction layout of caverns of an underground nuclear power plant in accordance to one embodiment of the invention.

As shown in FIGS. 1-3, a construction layout for caverns of an underground nuclear power plant in a longidtudinal direction of a mountain comprises: two primary caverns accommodating nuclear reactor powerhouses 1, combined caverns, electric powerhouse caverns 2, pressure relief caverns 7, a first primary traffic tunnel 8, a second primary traffic tunnel 9, a third primary traffic tunnel 10, a top adit system, a ground adit system, a primary steam channel 11, and a device conveying channel 12.

Two primary caverns accommodating nuclear reactor powerhouses 1 are provided. A connecting line of medial axes of the two primary caverns is perpendicular to a longitudinal direction of a mountain. A combined cavern is disposed on one side of each of the two primary caverns 1 along the longitudinal direction of the mountain. an electric powerhouse cavern 2 and a pressure relief cavern 7 are disposed on two sides of each of the two primary caverns 1 perpendicular to the longitudinal direction of the mountain. an arrangement of each electric powerhouse cavern 2 is perpendicular to the longitudinal direction of the mountain. A first primary traffic tunnel 8 and a third primary traffic tunnel 10 are disposed along the longitudinal direction of the mountain on outer sides of two combined caverns, respectively. A second primary traffic tunnel 9 is disposed along the longitudinal direction of the mountain between the two combined caverns. One end of each of the first primary traffic tunnel 8, the second primary traffic tunnel 9, and the third primary traffic tunnel 10 communicates with a ground surface. The two primary caverns 1, the combined caverns, electric powerhouse caverns 2, and pressure relief caverns 7 form a cavern group of the nuclear island powerhouse of the underground nuclear power plant. A skewback or an endwall of an arch crown of each cavern of the cavern group communicates with the ground surface via a top adit system functioned in construction. A bottom of a sidewall or a bottom of an endwall of each cavern of the cavern group communicates with the first primary traffic tunnel 8, the second primary traffic tunnel 9, and the third primary traffic tunnel 10 via a ground adit system functioned as a slag discharging channel.

Each of the combined caverns comprises: a first safe powerhouse cavern 3, a nuclear fuel powerhouse cavern 4, a second safe powerhouse cavern 5, and a nuclear auxiliary powerhouse cavern 6 longitudinally connected in series.

The top adit system comprises: a first primary adit 41, a first top adit 42 of a first primary cavern, a second top adit 43 of a second primary cavern, a second primary adit 31, a third primary adit 32, third top adits 33 of end parts of the combined caverns, fourth top adits 34 of the electric powerhouse caverns. Fifth top adits 35 of middle sections of the combined caverns, a sixth top adit 36 of a first pressure relief cavern, and a seventh top adit 37 of a second pressure relief cavern. The first primary adit 41, the second primary adit 31, and the third primary adit 32 are arranged along the longitudinal direction of the mountain and communicate with the ground surface. an elevation of the first primary adit 41 is higher than an elevation of the second primary adit 31 and an elevation of the third primary adit 32. The first primary adit 41 communicates with skewbacks of arch crowns of the two primary caverns 1 via the first top adit 42 of the first primary cavern and the second top adit 43 of the second primary cavern, respectively. One end of the second primary adit 31 and one end of the third primary adit 32 communicate with the endwall of the arch crown of an outer end face of a nuclear auxiliary powerhouse cavern 6 of a first combined cavern and the endwall of the arch crown of the outer end face of the nuclear auxiliary powerhouse cavern 6 of a second combined cavern, respectively. A middle section of the second primary adit 31 communicates with the endwall of the arch crown of an outer end face of a first safe powerhouse cavern 3 of the first combined cavern via one of the third top adits 33. A middle section of the third primary adit 32 communicates with the endwall of the arch crown of the outer end face of the first safe powerhouse cavern 3 of the second combined cavern via the other of the third top adits 33. Middle sections of the third top adits 33 communicate with endwalls of arch crowns of one ends of the electric powerhouse cavern 2 via the fourth top adits 34 of the electric powerhouse caverns, respectively. The middle section of the second primary adit 31 communicates with the skewback of the arch crown of a second safe powerhouse cavern 5 of the first combined cavern via one of the fifth top adits 35. The middle section of the third primary adit 32 communicates with the skewback of the arch crown of the second safe powerhouse cavern 5 of the second combined cavern via the other of the fifth top adits 35. The sixth top adit 36 of the first pressure relief cavern and the seventh top adit 37 of the second pressure relief cavern are disposed on the middle section and the end of the third primary adit 32 to communicate with the skewback of the arch crown of the first pressure relief cavern 7 and the skewback of the arch crown of the second pressure relief cavern 7, respectively. Each top adit of the top adit system has a longitudinal slope smaller than 12% to satisfy the requirement of trackless transportation.

The ground adit system comprises: first bottom adits 21 of the two primary caverns, second bottom adits 22 of first end parts of the combined caverns, third bottom adits 23 of the electric powerhouse caverns, fourth bottom adits 24 of second end parts of the combined caverns, and fifth bottom adits 25 of the pressure relief caverns. The second primary traffic tunnel 9 communicates with the bottom of the sidewall of the first primary cavern 1 and a bottom of the first pressure relief cavern 7 via one of the first bottom adits 21 and one of the fifth bottom adits 25, respectively. The third primary traffic tunnel 10 communicates with the bottom of the sidewall of the second primary cavern 1 and a bottom of the second pressure relief cavern 7 via the other of the first bottom adits 21 and the other of the fifth bottom adit 25, respectively. The first primary traffic tunnel 8 communicates with the bottom of the endwall of the first safe powerhouse cavern 3 of the first combined cavern via the first safe powerhouse cavern 3 of the second bottom adit 22. The second primary traffic tunnel 9 communicates with the bottom of the endwall of one end of the second combined cavern via the other of the second bottom adits 22. Each of the second bottom adits 22 of the first end parts of the combined caverns communicates with the bottom of the endwall of corresponding electric powerhouse cavern 2 via each third bottom adit 23 connected. The other end of the second primary traffic tunnel 9 communicates with the bottom of the endwall of the nuclear auxiliary powerhouse cavern 6 of the first combined cavern via one of the fourth bottom adits 24. The other end of the third primary traffic tunnel 10 communicates with the bottom of the endwall of the nuclear auxiliary powerhouse cavern 6 of the second combined cavern via the other of the fourth bottom adits 24. Each bottom adit of the ground adit system has a longitudinal slope smaller than 12% to satisfy the requirement of trackless transportation.

Each of the two primary caverns 1 communicates with a corresponding electric powerhouse cavern 2 via a primary steam channel 11 communicating with the ground surface. and the two primary caverns 1 are provided with corresponding apparatus conveying channels 12 communicating with the ground surface. The primary steam channel 11 and the apparatus conveying channels 12 are optionally adopted as the construction channels.

The underground nuclear power plant of this embodiment adopts the CUP 600 arrangement of the double reactors. The ore pass method is adopted to organize the excavation of the underground powerhouse caverns, that is, the excavation is organized on an upper working face, and slags are discharged from a bottom working face via a slag discharging pit. The ore pass method is able to satisfy the construction requirement by fewest construction channels. Thus, it only requires designing the ground adit system and the top adit system to communicate with the powerhouse caverns. The bottom adits are in bifurcate arrangement based on the first primary traffic tunnel 8, the second primary traffic tunnel 9, and the third primary traffic tunnel 10, and the top adits are in bifurcate arrangement based on the first primary adit 41, the second primary adit 31, and the third primary adit 32, which is beneficial for reducing the project quantity of the project construction. The ground adit system and the top adit system keep a certain distance away from the adjacent caverns for ensuring the stability and safety of the caverns. The excavated adits are few, the excavated distance is short, and the spaces between the adits and the caverns are proper, so that the cost is saved and the whole project is safe. Because the powerhouse caverns in the CUP 600 arrangement of the double reactors adopt modularized design, the modularization design is realized in the structure of the invention, which is specifically as follows:

Because the first primary traffic tunnel 8, the second primary traffic tunnel 9, and the third primary traffic tunnel 10 used as the permanent channels and the primary steam channel 11 optionally used as the channel are all arranged at the elevation of ±0 m, which is greatly different from bottom elevations of the powerhouse caverns: for example, the bottom elevation of the nuclear reactor powerhouse cavern 1 is −9.0 m, the bottom elevation of the combined cavern is −12.5 m, the bottom elevation of the electric powerhouse cavern 12 is −12.5 m, and the bottom elevation of the pressure relief cavern 7 is +20.0 m. Thus, the first primary traffic tunnel 8, the second primary traffic tunnel 9, and the third primary traffic tunnel 10 used as the permanent channels and the primary steam channel 11 optionally used as the channel cannot be directly utilized in either a horizontal face or a vertical face. In order to satisfy the requirement for discharging the excavated slag of the cavern bottoms, it is necessary to arrange the bottom adits to the cavern bottoms. In the meanwhile, in order to reduce the excavation rate of the mountain, to reduce the negative factors affecting the stability of the caverns, and to decrease the cost on the bottom adits, no primary bottom adit is individually designed, while the first primary traffic tunnel 8, the second primary traffic tunnel 9, and the third primary traffic tunnel 10 used as the permanent channels are fully utilized and bifurcated to form the bottom adits 21, 22, 23, 24, and 25 to reach the bottom elevation of the caverns. As an elevation difference between the pressure relief cavern 7 and the primary traffic tunnels reach 20 m, it is difficult to arrange bottom audit having proper slop, thus, the fifth bottom adit 25 is horizontally connected to the axis of the pressure relief cavern 7 and then connected to the bottom of the pressure relief cavern 7 by arranging a vertical slag discharging pit. The slops of the bottom pits are all smaller than 12% to satisfy the requirement of trackless transportation.

Because the top elevations of the powerhouse caverns are high and vary from one another. For example, the top elevation of the nuclear reactor powerhouse cavern 1 is +78.0 m, the top elevation of the combined cavern is +57.85 m, the top elevation of the electric powerhouse cavern 2 is +46.8 m, and the top elevation of the pressure relief cavern is +62.0 m, thus the first primary traffic tunnel 8, the second primary traffic tunnel 9, and the third primary traffic tunnel 10 as the permanent channels cannot be directly utilized in either a horizontal face or a vertical face. In addition, the elevation of the apparatus conveying channel 12 is +20.0 m, which is greatly different from the elevation of the cavern, thus, it is necessary to design top adits to connect to the skewback or the endwall of the arch crown of each cavern. As the arch crown of the nuclear reactor powerhouse cavern 1 is highest and is unable to share a common construction channel with other caverns in either the vertical face or the horizontal face, the first primary adit 41 is separately designed and bifurcated to form the first top adit 42 and the second top adit 43 to connect to the skewbacks of the arch crowns of corresponding two primary caverns 1 having an elevation of +65.0 m. Although the combined caverns, the electric powerhouse caverns 2, and the pressure relief caverns 7 are different in their top elevations, the height differences in the vertical face are relatively small, the three kinds of caverns share the second primary adit 31 and the third primary adit 32. The second primary adit 31 and the third primary adit 32 are bifurcated to form the third top adits 33, the fourth top adits 34, the fifth top adits 35, the sixth top adits 36, and the seventh top adits 37 to reach the elevation of the skewbacks of the caverns. The second primary adit 31 and the third primary adit 32 are connected to the endwalls of the arch crowns of the combined caverns having the elevation of +48.0 m. The third top adits 33 are bifurcated to form the fourth top adits 34 to connect to the endwalls of the arch crowns of the electric powerhouse caverns 2 having the elevation of +37.0 m. The third primary adits 32 are bifurcated to form the sixth top adits 36 and the seventh top adits 37 to reach the skewbacks of the arch crowns of the pressure relief caverns 7 having the elevation of +52.0 m. Because each of the combined caverns comprises four powerhouses and the axis of each of the combined caverns is relatively long, the second primary adit 31, the third primary adit 32, the third top adits 33, the fifth top adits 35, the second bottom adits 22, and the fourth bottom adits 24 are particularly arranged so as to enhance the working face, balance the construction period, and facilitate the supporting of the skewbacks therefore ensure the stability and safety during the construction period of the skewbacks. The slops of the top adits are all smaller than 12% to satisfy the requirement of trackless transportation.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A construction layout for caverns of an underground nuclear power plant in a mountain having a longitudinal direction, the construction layout comprising: two primary caverns accommodating nuclear reactor powerhouses, combined caverns, electric powerhouse caverns, pressure relief caverns, a first primary traffic tunnel, a second primary traffic tunnel, a third primary traffic tunnel, a top adit system, and a ground adit system;

wherein
  a connecting line of medial axes of the two primary caverns accommodating nuclear reactor powerhouses is perpendicular to the longitudinal direction of the mountain;
  each combined cavern is disposed on one side of each of the two primary caverns along the longitudinal direction of the mountain; each electric powerhouse cavern and each pressure relief cavern are disposed on two sides of each of the two primary caverns perpendicular to the longitudinal direction of the mountain; each electric powerhouse cavern is perpendicular to the longitudinal direction of the mountain;
  the first primary traffic tunnel and the third primary traffic tunnel are disposed along the longitudinal direction of the mountain on outer sides of the two combined caverns, respectively; the second primary traffic tunnel is disposed along the longitudinal direction of the mountain between the two combined caverns; one end of each of the first primary traffic tunnel, the second primary traffic tunnel, and the third primary traffic tunnel communicates with a ground surface;
  the two primary caverns, the combined caverns, the electric powerhouse caverns, and the pressure relief caverns form a cavern group of a nuclear island powerhouse of the underground nuclear power plant; and
  a skewback or an endwall of an arch crown of each cavern of the cavern group communicates with the ground surface via the top adit system; and a bottom of a sidewall or a bottom of an endwall of each cavern of the cavern group communicates with the first primary traffic tunnel, the second primary traffic tunnel, and the third primary traffic tunnel via the ground adit system.

2. The layout of claim 1, wherein
the top adit system comprises: a first primary adit, a first top adit of a first primary cavern, a second top adit of a second primary cavern, a second primary adit, a third primary adit, third top adits of end parts of the combined caverns, fourth top adits of the electric powerhouse caverns; fifth top adits of middle sections of the combined caverns, a sixth top adit of a first pressure relief cavern, and a seventh top adit of a second pressure relief cavern;
the first primary adit, the second primary adit, and the third primary adit are arranged along the longitudinal direction of the mountain and communicate with the ground surface; an elevation of the first primary adit is higher than an elevation of the second primary adit and an elevation of the third primary adit;
the first primary adit communicates with skewbacks of arch crowns of the two primary caverns via the first top adit and the second top adit, respectively;
one end of the second primary adit and one end of the third primary adit communicate with the endwall of the arch crown of one end of a first combined cavern and the endwall of the arch crown of one end of a second combined cavern, respectively; a middle section of the second primary adit communicates with the endwall of the arch crown of the other end of the first combined cavern via one of the third top adits; a middle section of the third primary adit communicates with the endwall of the arch crown of the other end of the second combined cavern via the other of the third top adits;
middle sections of the third top adits communicate with endwalls of arch crowns of one ends of the electric powerhouse cavern via the fourth top adits of the electric powerhouse caverns, respectively;
the middle section of the second primary adit communicates with the skewback of the arch crown of a middle section of the first combined cavern via one of the fifth top adits;
the middle section of the third primary adit communicates with the skewback of the arch crown of a middle section of the second combined cavern via the other of the fifth top adits; and
the sixth top adit and the seventh top adit are disposed on the middle section and the end of the third primary adit to communicate with the skewback of the arch crown of the first pressure relief cavern and the skewback of the arch crown of the second pressure relief cavern, respectively.

3. The layout of claim 2, wherein each top adit of the top adit system has a longitudinal slope smaller than 12%.

4. The layout of claim 2, wherein
the ground adit system comprises: first bottom adits of the two primary caverns, second bottom adits of first end parts of the combined caverns, third bottom adits of the electric powerhouse caverns, fourth bottom adits of second end parts of the combined caverns, and fifth bottom adits of the pressure relief caverns;
the second primary traffic tunnel communicates with the bottom of the sidewall of the first primary cavern and a bottom of the first pressure relief cavern via one of the first bottom adits and one of the fifth bottom adits, respectively; the third primary traffic tunnel communicates with the bottom of the sidewall of the second primary cavern and a bottom of the second pressure relief cavern via the other of the first bottom adits and the other of the fifth bottom adit, respectively;
the first primary traffic tunnel communicates with the bottom of the endwall of one end of the first combined cavern via one of the second bottom adit; the second primary traffic tunnel communicates with the bottom of the endwall of one end of the second combined cavern via the other of the second bottom adits;
each of the second bottom adits communicates with the bottom of the endwall of corresponding electric powerhouse cavern via each third bottom adit connected; and
the other end of the second primary traffic tunnel communicates with the bottom of the endwall of the other end of the first combined cavern via one of the fourth bottom adits; the other end of the third primary traffic tunnel communicates with the bottom of the endwall of the other end of the second combined cavern via the other of the fourth bottom adits.

5. The layout of claim 4, wherein each bottom adit of the ground adit system has a longitudinal slope smaller than 12%.

6. The layout of claim 4, wherein
each of the combined caverns comprises: a first safe powerhouse cavern, a nuclear fuel powerhouse cavern, a second safe powerhouse cavern, and a nuclear auxiliary powerhouse cavern longitudinally connected in series;
each of the second bottom adits communicates with a bottom of an endwall of the first safe powerhouse cavern;

each of the fourth bottom adits communicates with a bottom of an sidewall of the nuclear auxiliary powerhouse cavern;

one ends of the second primary adit and the third primary adit communicate with endwalls of arch crowns of outer end faces of corresponding nuclear auxiliary powerhouse cavern;

each of the third top adits of the end parts of the combined caverns communicates with an endwall of an arch crown of an outer end face of the first safe powerhouse cavern; and each of the fifth top adits of the middle sections of the combined caverns communicates with a skewback of an arch crown of the second safe powerhouse cavern.

7. The layout of claim 1, wherein each of the two primary caverns communicates with a corresponding electric powerhouse cavern via a primary steam channel communicating with the ground surface; and the two primary caverns are provided with corresponding apparatus conveying channels communicating with the ground surface.

8. The layout of claim 2, wherein each of the two primary caverns communicates with a corresponding electric powerhouse cavern via a primary steam channel communicating with the ground surface; and the two primary caverns are provided with corresponding apparatus conveying channels communicating with the ground surface.

9. The layout of claim 3, wherein each of the two primary caverns communicates with a corresponding electric powerhouse cavern via a primary steam channel communicating with the ground surface; and the two primary caverns are provided with corresponding apparatus conveying channels communicating with the ground surface.

10. The layout of claim 4, wherein each of the two primary caverns communicates with a corresponding electric powerhouse cavern via a primary steam channel communicating with the ground surface; and the two primary caverns are provided with corresponding apparatus conveying channels communicating with the ground surface.

11. The layout of claim 5, wherein each of the two primary caverns communicates with a corresponding electric powerhouse cavern via a primary steam channel communicating with the ground surface; and the two primary caverns are provided with corresponding apparatus conveying channels communicating with the ground surface.

12. The layout of claim 6, wherein each of the two primary caverns communicates with a corresponding electric powerhouse cavern via a primary steam channel communicating with the ground surface; and the two primary caverns are provided with corresponding apparatus conveying channels communicating with the ground surface.

* * * * *